INVENTOR.
Giuseppe Alfieri
BY
Bierman & Bierman
Attorneys

United States Patent Office 3,074,739
Patented Jan. 22, 1963

3,074,739
SYSTEM AND PNEUMATIC DEVICE FOR VARYING THE CHASSIS LEVEL OF VEHICLES EQUIPPED WITH COMPRESSED AIR SUSPENSIONS
Giuseppe Alfieri, Milan, Italy, assignor to Fabbrica Italiana Magneti Marelli S.p.A., Milan, a corporation of Italy
Filed July 22, 1960, Ser. No. 44,709
Claims priority, application Italy Aug. 3, 1959
1 Claim. (Cl. 280—124)

The present invention deals with a system and pneumatic device for varying the chassis level of vehicles equipped with compressed air suspension systems.

It is commonly known that one of the fundamental characteristics of pneumatic suspension is that of maintaining the chassis level with the ground independent of the load conditions of the vehicle.

This is achieved by means of levelling valves (or levelling devices) mounted on the vehicle chassis, and also with resilient springs (or bellows) located between the wheel axles and the chassis.

The levelling device provides for the adjustment of the pressure in the aforesaid springs, by means of the action of a control operating lever connected to the wheel axle by means of a tie rod.

Each change of load on the vehicle causes a corresponding angular displacement of the above mentioned lever, with a consequential activation of the levelling device which causes feeding or discharge of the aforesaid mentioned springs, brings the chassis back to its predetermined position.

The control lever is found in the position of equilibrium when the chassis is at its pre-determined level; this level being determined by the length of the tie rod which connects the free extremity of said lever with the non-suspended part of the vehicle.

The level plane is established definitely during assembly and setting up of the pneumatic suspension.

It is commonly known that the embodiment of the fixed level type of chassis presents the disadvantage of not facilitating the carrying out of several vehicle operations such as those dealing with loading and unloading.

For example and particularly during loading operations, it would be greatly desirable to be able to be in a position to have the chassis lowered, and then bring it back to the established level at the conclusion of loading operations.

The aim of the present invention is to suggest a control system and device which in fact would allow the vehicle driver to bring the chassis level to different planes at will, and this to be accomplished independently of the load, load variations, and the travelling or stationary conditions of the vehicle.

This, according to the present invention is achieved by controlled changing of the efficient length of the tie rod, and that is to say, the rod which connects the operating lever of the levelling device with the non-suspended part of the vehicle. The end of the tie rod directed to the non-suspended part of the vehicle or wheel axle is connected to the piston of a cylinder in such a manner, that depending on the position which said piston is made to assume, the height of the level plane of the chassis can be determined as may be desired.

With this aim in view, the cylinder is fixed to the wheel axle of the vehicle, whilst the piston at one of its extremities is subjected to the compressed fluid pressure, and at its other extremity to the action of a preloaded spring.

The invention will be illustrated, and only for purposes of example, on the basis of the attached drawing in which.

With reference to the drawings.

Figure 1:
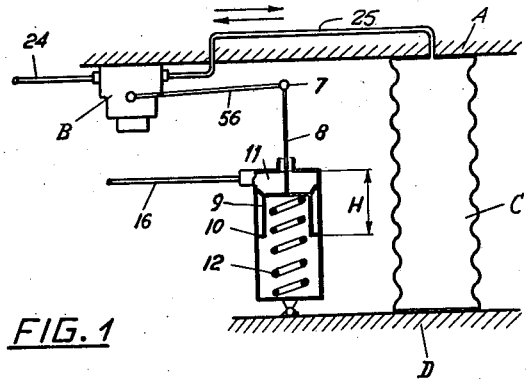
FIGURE 1 shows a normal pneumatic suspension assembly equipped with a device permitting the raising of the chassis level.

1 indicates the vehicle chassis A, B the levelling apparatus fixed to the chassis, and C the pneumatic spring located between chassis A and wheel axle D.

The levelling device B, depending on the load operating on the chassis feeds or discharges spring C through pipe 25.

Control of the levelling device is obtained by means of lever 56 connected at one extremity to the real and proper operating units of the apparatus, whereas the other extremity 7 is connected to an extremity of tie rod 8. The other extremity of the tie rod according to the invention is connected to piston 9 of the single acting cylinder 10, which is connected to the non-suspended part D of the vehicle. Said piston 9 is at one of its sides under the action of a helicoidal spring 12 and at the other side, during feeding step, to the pressure of fluid in chamber 11.

More specifically, a single acting cylinder is provided instead of a connecting tie rod, which in the rest position, as shown in the drawing, by the action of spring 12, maintains the desired distance between point 7 and the wheel axle D.

With reference to FIG. 1, whenever compressed air is delivered to chamber 11 located in the upper cylinder head of the cylinder, the distance between points 7 and D, due to the compression of spring 12, is reduced by a distance equal to the length H of the piston stroke, causing a lowering of point 7, and hence a clockwise rotation of lever 56. The intervention of the levelling device is such as to cause the discharge of air from bellows C with the subsequent lowering of the chassis A to the new position of equilibrium, which corresponds to a lower level by the amount of the length of the piston stroke H than the preceeding level.

On the release of the compressed air in 11, spring 12 distends, re-establishing the original distance between extremity 7 and the wheel axle D, and renewing the normal level conditions of the chassis.

Figure 2:
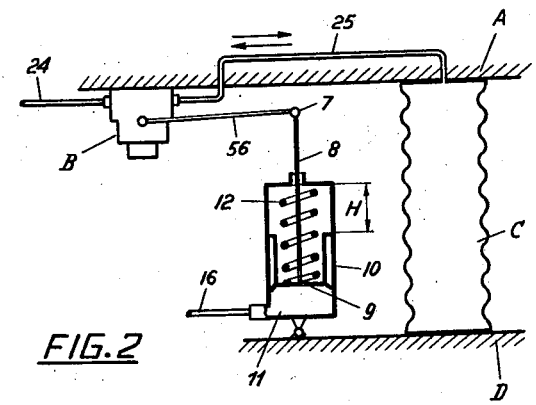
FIGURE 2 shows the same assembly with a device for lowering the chassis level.

In the device shown in FIGURE 2, feed chamber 11, is located in the lower cylinder head 10, and for which reason when compressed air is delivered to said chamber, upward movement is given to point 7 and then an anticlockwise rotation to lever 56.

The levelling device in this instance provides the feeding of spring C with a subsequent raising of the chassis up to a distance equal to the length of the piston stroke H with respect to the preceeding level.

It is clear that both the above illustrated performances can be combined in a double acting cylinder with the pistons in rest located in the centre of the cylinder.

Figure 3:
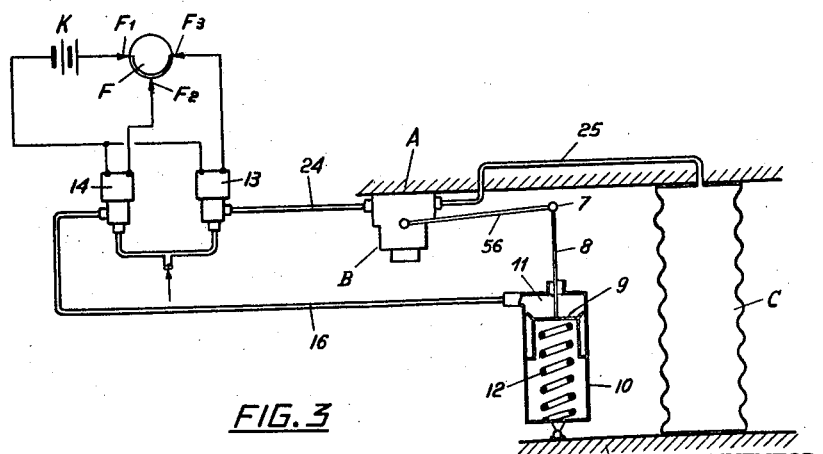
FIGURE 3 shows the assembly of FIG. 1 fed by a self-acting levelling device.

The above mentioned level changing devices can be applied to installations equipped with any type of levelling device: In FIGURE 3, let it be supposed that the levelling element B is of the self-acting type, and which comprises the adoption of a structure equipped with a normal electro-distributor activator 13, of the leveller of the electro-distributor 14, for feeding the level variation device as well as the combination switch F.

This latter can assure three positions:

Position F1: both electro-distributors 13 and 14 are inactive. The level of the chassis is that predetermined for this rest condition.

Position F2: both electro-distributors 13 and 14 are excited simultaneously with consequent activation of the levelling element and the level variation device.

Position F3: only electro-distributor 13 is excited.

Therefore the levelling element is activated with equilibrium at normal level.

Normally position F2 is that assumed during loading operations of the vehicle by creating a lowering of the chassis.

During vehicle motion on the other hand, the chassis is brought again to the normal level, and therefore the level variation device must be inactive and the levelling apparatus loaded. This condition is established by the commutator F in position F3.

I claim:

A system for varying the level of the chassis of a vehicle provided with pneumatic suspension comprising, a cylinder having a piston operative within it, a lever having one end pivotally and operatively connected to a levelling apparatus fixed to the chassis, a rod extending from the piston and connected to the second end of the lever whereby reciprocating movements of the piston will impart pivotal movements to the lever, the cylinder being carried by a non-suspended part of the vehicle, spring means operative against one side of the piston, an air chamber in the cylinder at the opposite side of the piston, and means for supplying air thereto, a pneumatic spring positioned between the chassis and the non-suspended part of the chassis and a communication between the levelling apparatus and said pneumatic spring, wherein the levelling apparatus is of the self-acting type and includes a first electro distributor for feeding air to the levelling apparatus, a second electro distributor for feeding air to the level-changing cylinder, and a three-position switch for controlling the distributors, said switch in one position rendering both of the distributors inactive; in a second position actuating both of the distributors, and in a third position actuating only one of the distributors.

References Cited in the file of this patent
UNITED STATES PATENTS

| | | |
|---|---|---|
| 2,933,104 | Jackson | Apr. 19, 1960 |
| 2,939,723 | Wisnieswski | June 7, 1960 |
| 2,978,256 | Bertsch | Apr. 4, 1961 |